United States Patent Office 3,372,131
Patented Mar. 5, 1968

3,372,131
FIRE PROTECTING ADHESIVES COMPRISING DICYANDIAMIDE-ALDEHYDE CONDENSATION PRODUCT
Hans Adolf Rohlfs and Heinz Schmidt, Wiesbaden-Biebrich, and Karl Stumpp, Wiesbaden, Germany, assignors to Chemische Werke Albert, Wiesbaden-Biebrich, Germany, a corporation of Germany
No Drawing. Filed Mar. 31, 1964, Ser. No. 356,023
Claims priority, application Germany, Apr. 6, 1963, C 29,594; Feb. 21, 1964, C 32,215
19 Claims. (Cl. 260—17.3)

ABSTRACT OF THE DISCLOSURE

The invention relates to novel fire retardant adhesive compositions comprising an amine-aldehyde condensation product prepared by condensing an aminoplast forming compound comprising dicyandiamide and an aldehyde at least in part in the presence of phosphate ions and at least in part in the presence of ammonium ions, the phosphate ion component being present in an amount of at least 4.1% by the weight of the anhydrous amino-compound and the anhydrous aldehyde, and a method of forming fire-retardant adhesive bonds between two surfaces.

---

This invention is concerned with improvements in or relating to fire-retardant adhesives.

Fire-retardants have been proposed which can be applied to an article to be protected as a film which foams under the action of heat. There are various ways by which such a film which expands during a fire may be derived, thus for example condensation products of amines and aldehydes may be used with various additives for this purpose. Hitherto it is not known to modify the properties of these products in a manner that they simultaneously have a fire protection and adhesive effect.

It has also previously been proposed to use condensation products of amines and aldehydes as adhesives. However, it has been found difficult to develop commercially usable adhesives, for example from formaldehyde and urea, although the reaction procedure in principle would appear to be simple. By altering the proportions of the reaction components, the type and amount of the condensation agent and the reaction conditions, condensation products of widely differing properties may be obtained. From many possible products only a few have been commercially produced.

In the literature there is however no reference that such adhesive also has or may be given flame protecting properties.

According to the present invention there are provided fire retardant adhesive compositions comprising a condensation product derived from amines, aldehydes, and phosphates or phosphoric acid which compositions possess both adhesive properties and flame retarding properties; thus they are completely new compositions. Preferably they also contain a skeleton-forming compound, i.e. a compound causing the formation of a supporting skeleton upon the action of heat. The condensation products used are those prepared by condensing an amine and an aldehyde at least in part in the presence of phosphate ions and preferably also of ammonium ions as well. Convenient compounds and quantities thereof for deriving the condensation product are for example 1 to 5 mols of dicyandiamide, 0 to 3.5, preferably 0.8 to 2.5 mols of urea, 0 to 2 mols of melamine and 0.5 to 4, preferably 0.8 to 3 mols, of ammonium phosphate, water in an amount which is at least that necessary for the condensation, and formaldehyde in an amount of at least 0.75 mol, preferably of 0.9 to 2.5 mols, per mol of amine present. This reaction may be carried out under conditions known per se and at a temperature in the range from 70 to 115° C. The amount of water is preferably between 10 and 60 and preferably above 20 percent by weight, calculated on the solids content of the product obtained by the condensation reaction. If less than 1 mol of formaldehyde is used per mol of amine, dicyandiamide is preferably also present in a molar amount which is at least as large as the molar difference between formaldehyde and amine. The maximal amounts of dicyandiamide on one hand and melamine and/or urea on the other hand are suitably not used simultaneously.

Other suitable condensation products which may be used are the polyalkylol-1,3,5-triazines, preferably polymethylol-1,3,5-triazines having more than 3 alkylol groups which may conveniently be etherified with monohydric alcohols to the extent of at least 50%, preferably from 60 to 90%, and which are produced at least in one stage in the presence of phosphate ions. These polyalkylol compounds may be produced from an aldehyde and one or more derivatives of 1,3,5-triazine, namely from a guanamine, ammeline or preferably melamine, if desired in admixture with up to an equimolar amount of urea, dicyandiamide, guanidine or mixtures of such compounds. The use of tetra- to hexamethylol-melamines or etherification products thereof is preferred.

The guanamines are prepared by the reaction of nitriles with dicyandiamide. Suitable nitriles are hydrogen cyanide, acetonitrile, propionic acid nitrile, stearic acid nitrile, benzylcyanide, succinic acid dinitrile, adipic acid dinitrile, sebacic acid dinitrile and terephthalic acid dinitrile.

The aldehyde component of the condensation products of the present invention is usually formaldehyde; however, other aldehydes such as acetaldehyde or hydroxyaldehydes may also be used. The formaldehyde may conveniently be used as paraformaldehyde; generally, however, instead of using concentrated formaldehyde or in addition thereto an aqueous solution of for example 30% is used so that the required amount of water is simultaneously added. The aldehyde—as may the other reactants—may be added during the reaction in several portions.

In the etherification products the alkylol groups are preferably etherified with lower aliphatic alcohols having up to 4 carbon atoms such as ethanol, propanol, isopropanol, or the butanols, preferably, however, with methanol.

The condensation products of the present invention can conveniently be produced in a one or two stage reaction, in at least one of which preferably in the later stage, phosphate ions are present, generally in an amount of 10 to 60% and preferably from 25 to 50% by weight, calculated as 100% phosphoric acid and based on the weight of the anhydrous amine and aldehydes. The phosphate ions may conveniently be introduced by operating the condensation in the presence of phosphoric acid or acidic salts thereof, particularly monoammonium orthophosphate, diammonium orthophosphate or ammonium polyphosphate including the metaphosphates. As well as the phosphate ion source there may also conveniently be present other mineral acids such as concentrated hydrochloric acid or boric acid or organic amido acids such as amidosulphonic acid. In order to adjust the pH of 1 to 7, which in the compositions containing as the essential ingredient the reaction product of an amine-aldehyde-precondensate with an acidic mixture such as in Examples 4 and 5 is preferably within the range of pH 1 to pH 4 or in the case of the other products is preferably in the range from 3 to 7 or in order to vary the fire retarding effects salts which per se have a fire-retardant action, such as ammonium salts may also be added. This may be accomplished by the use of the above-mentioned ammonium phosphates, or alkali-borates or -polyborates. These salts are conveniently used in an amount such that the proportion of phosphate in the composition is not greater than 45 percent by weight and preferably between 10 and 30 percent by weight based on total weight of the composition.

Suitable structure-forming compounds include for example substances which have a high carbon content but are nonresinic, such as carbohydrates, e.g. dextrine, starch or sugar or proteins or animal glues. These substances are generally present in an amount of up to 25%, preferably 3 to 15% by weight, calculated on the total weight of the mixture. The adhesive compositions of the present invention may also contain softeners such as tricresylphosphate, trichloroethylphosphate, phthalates such as dibutyl- or dioctylphthalate, diluents or a dissolving intermediary such as ethylene glycol, butylene glycol or diethylene glycol monoethyl ether and/or substances capable of combining with water, such as lactic acid or salts or esters thereof such as calcium lactate, ethyl lactate, butyl lactate, sorbitol, mannitol, penta- or dipenta-erythritol, glycerol, trimethylolalkanes such as trimethylol-ethane or -propane or 2,2-dimethylol-1,5-dihydroxypentane. The combined amount of the components of any group, i.e. softeners, diluents etc. may for example be up to 10%%, preferably between 3 and 7% or if desired only 1 to 5%, calculated on the weight of the composition. Substances by which the pH may be adjusted such as maleic anhydride may also be added, e.g. in an amount of 0.5 to 2%, calculated on the weight of the composition.

The adhesives according to the invention are generally applied in the form of solutions or dispersions and therefore may also contain minor amounts of anti-foaming agents which facilitate application. Minor proportions of wetting agents may also be added. Fungicides may also be added. These adhesives of the invention which contain as the essential ingredient the reaction product of an amine-aldehyde-precondensate with an acidic mixture such as is Examples 4 and 5, have the remarkable advantage that in general they dry to provide a glue which is water-proof.

It will of course be apparent that the speed of condensation, the strength of the glue and the fire retarding properties thereof may be influenced by modifying the amount and nature of the components and by the conditions used during the condensation.

The adhesives of the invention which have been produced in a one-stage process such as according to Examples 1 to 3 may be formed into powders by spray drying. Before processing, these powdery products are mixed with water to yield an adhesive ready for use. A supplemental addition of a little amount of water is possible in order to dilute an adhesive which is too viscous.

The fire-retarding adhesives of the invention are suitable for use in situations in which the combined properties of adhesivity and fire protection are desired or necessary. Thus they may for example be used for the manufacture of fire retardant cardboard, for jointing work in the interior of cars, railway carriages, ships and aeroplanes. An important application is the use of such an adhesive for the manufacture of fire-retardant protective fabric or of a fire retardant stage scenery. Moreover material may be glued on one side of a fabric or paper with a composition produced in a one-stage process such as according to Examples 1 to 3, which paper or fabric may then be rolled after the adhesive has become dry. On rolling down and wetting, adhesive tapes are obtained which may be used for example as a protective fabric for a welder. Rough temperature indicators, which have layers of various colours and which, at least in the lower layers, can be recognized after a certain exposure to heat may also be produced with the aid of the adhesive substances of the present invention. In addition the adhesive substances are particularly suitable for use with wallpapers, textile fabrics and similar materials and also with wood, wood chip board and for jointing building materials such as those consisting of wood. Surprisingly the joint between such materials is retained after action of heat. They also may be used as an intermediate layer in the coating of plastic boards or plastic foils with other combustible materials or in the manufacture of foamed plastics.

The products of the invention may not only be used for joining different materials, but also as so-called inner adhesives. Thus masses of paper may be glued whereby a fire retardant paper is obtained which is particularly suitable as a covering for plaster boards.

It is also possible to bond glass fibres under pressure by the adhesives of the invention to produce building panels. They are also suitable as binding agents in knifing compositions as additives in the manufacture of wood chip boards or wood fibre boards or other building materials prepared from wood.

Bars of spruce wood which have been cut at an angle and which have been jointed at the angle surfaces by the fire protecting adhesive have been found to have after three days a bending strength under tension of between 62 and 65 kg./cm.$^2$. If small panels of spruce wood (6 x 6 x 2 cm.) are jointed by the fire protecting adhesive of the invention at the smooth surfaces so that they are staggered about 1 cm. against each other, the wood is torn at a shearing strength of 95 kg./cm.$^2$ while the glued joint is preserved.

The invention will now be illustrated with reference to the following examples in which all percentages are by weight.

*Example 1*

1.73 kg. of a 30% aqueous solution of formaldhyde in a 5 litre glass flask, provided with a stirrer and a reflux condenser was heated to 100° C. and then over 15 minutes 0.872 kg. of a mixture of 0.548 kg. of dicyandiamide and 0.324 kg. of urea, was added thereto in portions. Subsequently over a further 15 minutes, 0.932 kg. of $NH_4H_2PO_4$ and then 0.20 kg. of dextrine were added thereto. The mixture was then refluxed for one hour. The adhesive thus obtained was repeatedly used for jointing two plywood boards 15 x 2.5 x 0.5 cm. For this purpose the two pieces were placed together by the front sides and the joint is covered and glued over with a third piece (7 x 2.5 x 0.5 cm.). The tensile strength was on an average 10 kg./cm.$^2$.

This adhesive was applied in one coat in an amount of 350 g./m.$^2$ onto one side of a spruce wood panel (9.5 x 9.5 cm.). Many such panels were tested in a flame test device according to Schütze (VFDB–Zeitschrift, volume 5, 9 (1956); VFDB—Verinigung zur Förderung des Deutschen Brandschutzes). The time after which inflammation occurs is about 30 seconds in the case of untreated plates, and between 7 and 11 minutes in the case of the treated plates.

Corrugated paper (290 g./m.$^2$) was laminated with paper (68 g./m.$^2$) using 170 g./m.$^2$ of the product described above. From this corrugated cardboard 12.5 x 12.5 x 15 boxes were produced, so that the paper treated with the adhesive was on the outside. The card-board was then exposed to the full flame of a Teclu-Bunsen burner at a distance of 5 to 6 cm. A foam layer formed on the outside which was only penetrated by the flame after 5 to 6 minutes. On removal of the flame the inner portion of the corrugated card-board was then self-extinguishing. A cardboard which was produced in the same manner with the use of a bone glue by the same treatment burned completely after about ½ minute.

Example 2

7 kg. of a 30% aqueous solution of formaldehyde were mixed at room temperature with stirring with 3.7 kg. of a mixture of 2.9 kg. of dicyandiamide and 0.8 kg. of urea. After stirring for 3 hours, 3.7 kg. of $NH_4H_2PO_4$ were worked in and the total batch was stirred again for 5 hours. A product was obtained having very good adhesive and flame retarding properties.

Example 3

1.7 kg. of a 30% aqueous formaldehyde solution were heated to 80° C., 1.5 kg. of dicyandiamide and then 0.93 kg. of $NH_4H_2PO_4$ and 0.2 kg. of dextrine were stirred thereto. After heating for two hours to 80° C. this batch yielded a fire retarding adhesive having useful properties.

Example 4

A precondensate derived from 40 g. of melamine, 30 g. of a 30% aqueous formaldehyde solution, 12 g. of paraformaldehyde, 15 g. of butanediol-1,4 and 5 g. of ethylene glycolmonoethyl ether is admixed with a solution of 40 g. of a 75% phosphoric acid, 10 g. of concentrated hydrochloric acid, 18 g. of paraformaldehyde, 20 g. of water, 5 g. of dextrine and 10 g. of dicyandiamide in a weight ratio of 1:1 and further condensed for 30 to 60 minutes at room temperature. An adhesive solution ready for use was obtained which had a pot life of 8 to 10 hours. The solution gave strong joints.

The fire retarding effect is shown by the following test. A surface coating of 350 g./m.² on a spruce wood board when tested in the radiation testing apparatus according to Schütze (see Example 1) at a radiation intensity of 1 cal./cm.² sec. ignited after 10 to 11 minutes, while a spruce wood board of the same size, but without the coating, ignited after only 25 to 35 seconds.

Example 5

A precondensate derived from 33.3 g. of melamine, 30 g. of paraformaldehyde, 7 g. of a 30% aqueous formaldehyde solution, 35 g. of 95% methanol and 6 g. of butane-1,4-diol is admixed with a solution made up from 45 g. of a 75% phosphoric acid, 2.5 g. of paraformaldehyde, 15 g. of a 30% aqueous formaldehyde solution, 7.5 g. of dicyandiamide, 11 g. of dextrine and 10 g. of ethylene glycol in a volume relation of 1.2:1 and condensed for a further half to one hour at room temperature. An adhesive solution ready for use is obtained which has a pot life of 8 to 10 hours. The solution gives strong joints.

As a test of the fire retarding properties of the product of this example 350 g./m.² were applied to wood boards (100 x 19 x 2 cm.) which were tested by putting them vertically into a shaft, at the bottom of which there was an annular gas flame, while air was passed continuously through the shaft (preliminary testing guide lines according to DIN 4102 "schwer entflammbar für Baustoffe"— "fire resistant building materials"). In comparison with the theoretical values required for fire resistant materials (loss by burning less than 15%, height of flame less than 100 cm. temperature of burned gas lower than 250° C., undecomposed board length greater than 15 cm.) the following values were found: loss by burning 9.9%, height of flame 90 cm., burned gas temperature 135° C., undecomposed board length 23 cm.

It will be understood that the illustrative embodiments of the invention set out herein do not constitute a limitation upon the invention for those skilled in the art can make various modifications in the details of these illustrative embodiments without departing from the spirit and scope of the invention as set out above and defined in the appended claims.

What is claimed is:

1. A fire-retardant adhesive for bonding two surfaces comprising an amine-aldehyde condensation product prepared by condensing an aminoplast forming compound comprising dicyandiamide and an aldehyde at least in part in the presence of phosphate ions and at least in part in the presence of ammonium ions, the phosphate ion component being present in an amount of at least 4.1% by the weight of the anhydrous amino compound and the anhydrous aldehyde and containing as an essential ingredient a skeleton-forming compound comprising a substance selected from the group consisting of carbohydrates and proteins.

2. A fire-retardant adhesive for bonding two surfaces comprising an amine-aldehyde condensation product prepared by condensing 1 to 5 moles of dicyandiamide, 0.8 to 3.5 moles of urea, 0 to 2 moles of melamine and 0.75 to 2.5 moles of formaldehyde per mole of amine at least in part in the presence of phosphate ions and at least in part in the presence of ammonium ions, the phosphate ion component being present in an amount of at least 4.1% by the weight of the anhydrous amino compound and the anhydrous aldehyde.

3. The composition of claim 1, wherein the condensation product is derived from 1 to 5 mols of dicyandiamide, 0 to 3.5 mols of urea, 0 to 2 mols of melamine, 0.5 to 4 mols of an ammonium phosphate and formaldehyde, the latter being present in an amount of at least 0.75 mol per mol of amine.

4. A fire-retardant adhesive as claimed in claim 1, wherein the said amine-aldehyde condensation product has been prepared by condensing the said aminoplast forming component in the presence of the said skeleton-forming compound.

5. The composition of claim 1, wherein the condensation product has been prepared at least in part in the presence of a phosphate selected from the group consisting of monoammonium orthophosphate, diammonium orthophosphate and a mixture thereof.

6. The composition of claim 5, in which the condensation product has been prepared from at least one of the amines and an aldehyde at reflux temperature.

7. The composition of claim 1, wherein in the preparation of the condensation product phosphate groups have been present in at least one stage in an amount of from 10 to 60%, calculated as 100% phosphoric acid and based on the weight of the anhydrous amine and aldehyde.

8. The composition of claim 1, wherein the condensation product is derived from formaldehyde.

9. The composition of claim 3, wherein the amount of formaldehyde is less than 1 mol per mol of amine and wherein dicyandiamide is present in a molar amount which is at least as high as is the difference between the molar amounts of formaldehyde and amine.

10. The composition of claim 1, wherein the condensation product has been prepared in at least one stage from a precondensate of at least one of the amines and an aldehyde, which has been further condensed with an aldehyde in a second stage, said phosphate ions having been present in said second stage.

11. The composition of claim 3, wherein the dicyandiamide is present in a molar amount which is at least as high as is the molar excess of the amine over the formaldehyde, and which also contains a skeleton-forming compound selected from the group consisting of carbohydrates, proteins and in an amount between 3 and 15% of the weight of the composition.

12. The composition of claim 10, wherein the condensation product also contains a polyalkylol compound containing more than three alkylol groups which is at least in part derived from a 1,3,5-triazine.

13. The composition of claim 12, wherein the polyalcohol compound is a polymethylol compound and contains from four to six methylol groups.

14. The composition of claim 13, wherein at least 30% of methylol groups are etherified by a monohydric alcohol containing up to 4 carbon atoms.

15. The composition of claim 1, wherein the amount of phosphate is not higher than 45% by weight, calculated on the weight of the composition.

16. The composition of claim 3, wherein the skeleton forming compound is dextrine and is present in an amount up to 25% by weight calculated on the total weight of the composition.

17. The composition of claim 1, which also contains at least one auxiliary compound selected from the group consisting of softeners, water-binding substances and diluents.

18. The composition of claim 11, which is in a spray-dried form and has a pH in the range from 3 to 7 and in which the condensation product has been prepared at a temperature in the range from 70 to 115° C.

19. The composition of claim 12, wherein the 1,3,5-triazine condensation product is selected from the group consisting of a polymethylol compound of a 1,3,5-triazine containing more than 3 methylol groups, and etherification products thereof in which 60 to 90% of the methylol groups are etherified by a monohydric alcohol containing up to 4 carbon atoms, said polymethylol compounds having been prepared in two stages in the latter of which phosphate groups were present in an amount of 25 to 50%, calculated as 100% phosphoric acid and based on the weight of the anhydrous amine and aldehyde, and said composition also containing a skeleton-forming compound in an amount between 3 and 15% by weight, calculated on the total weight of the composition.

References Cited

UNITED STATES PATENTS 2,452,054  10/1948  Jones et al.
2,632,742  3/1953  Eckert.
3,037,951  6/1962  Basto et al.

OTHER REFERENCES

Delmonte, Technology of Adhesives, Reinhold Publishers, 1947, pp. 64–69.

WILLIAM H. SHORT, *Primary Examiner.*

J. NORRIS, *Assistant Examiner.*